A. WOLLENSAK AND F. A. G. PIRWITZ.
PHOTOGRAPHIC SHUTTER.
APPLICATION FILED JAN. 12, 1921.

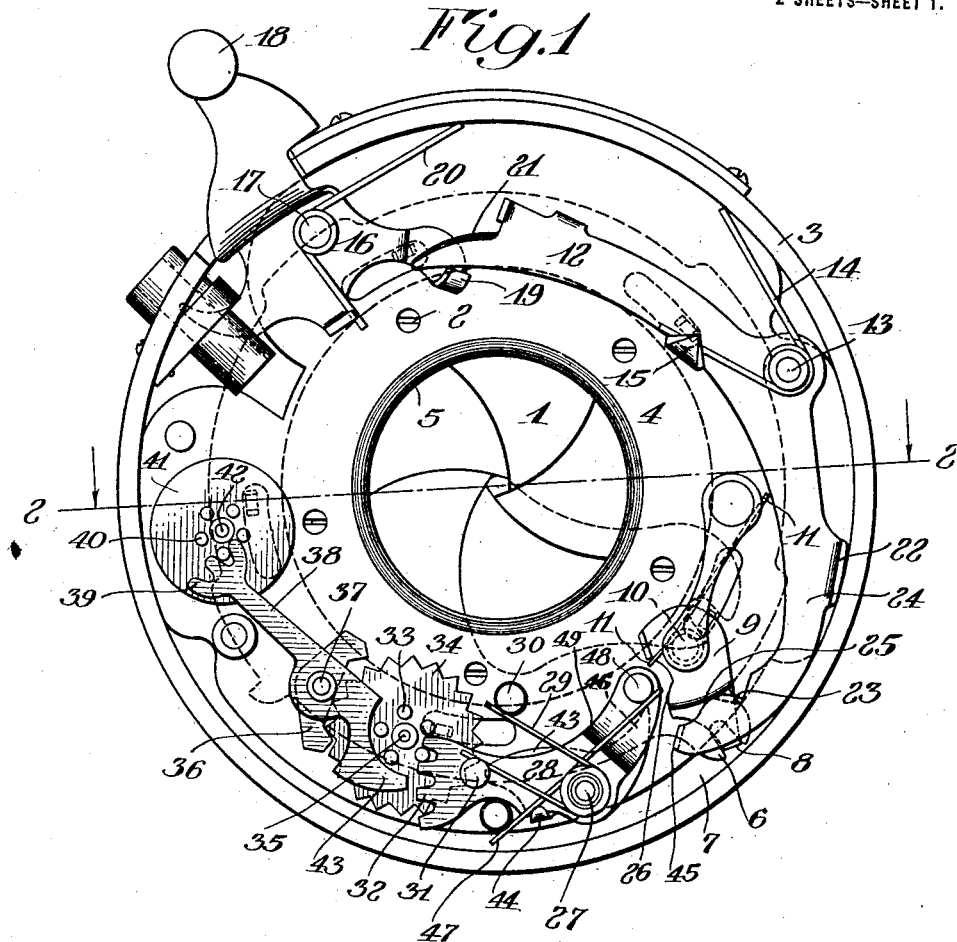
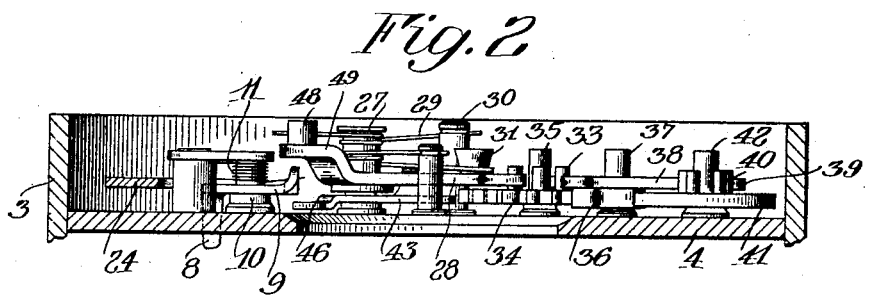

1,397,669.

Patented Nov. 22, 1921.
2 SHEETS—SHEET 2.

INVENTORS
Andrew Wollensak
Friedrich A. Gustav Pirwitz
by Frederick L. Emrich
their Attorney

UNITED STATES PATENT OFFICE.

ANDREW WOLLENSAK AND FRIEDRICH A. GUSTAV PIRWITZ, OF ROCHESTER, NEW YORK, ASSIGNORS TO WOLLENSAK OPTICAL COMPANY, OF ROCHESTER, NEW YORK, A CORPORATION OF NEW YORK.

PHOTOGRAPHIC SHUTTER.

1,397,669.   Specification of Letters Patent.   Patented Nov. 22, 1921.

Application filed January 12, 1921. Serial No. 436,753.

*To all whom it may concern:*

Be it known that we, ANDREW WOLLENSAK and FRIEDRICH A. GUSTAV PIRWITZ, citizens of the United States, and residents of Rochester, in the county of Monroe and State of New York, have invented certain new and useful Improvements in Photographic Shutters; and we do hereby declare the following to be a full, clear, and exact description of the same, reference being had to the accompanying drawings, forming a part of this specification, and to the reference-numerals marked thereon.

Our present invention relates to photography and more particularly to photographic shutters of the blade type in which the duration of exposure is timed by a retarding mechanism that exerts a variable resistance upon the element that actuates the blades to closed position and the invention has for its object to provide a simple, cheap and dependable retarding device for this purpose. The improvements are directed in part toward rendering the device easy to assemble and yet uniform and efficient in its action. To these and other ends the invention resides in certain improvements and combinations of parts all as will be hereinafter more fully described, the novel features being pointed out in the claims at the end of the specification.

In the drawings:

Figure 1 is a front view of a shutter constructed in accordance with and illustrating one embodiment of our invention with the cover plate removed;

Fig. 2 is a section taken substantially on the line 2—2 of Fig. 1, looking in the direction of the arrows.

Similar reference numerals throughout the several views indicate the same parts.

Figure 3:
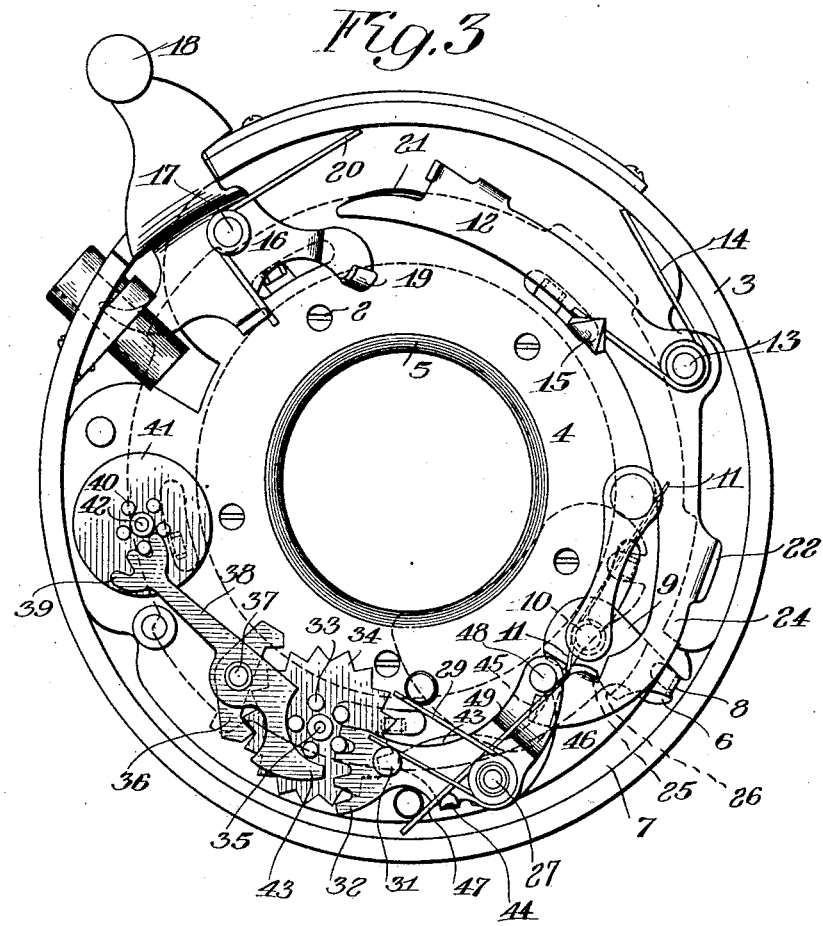
Fig. 3 is a view similar to Fig. 1 but with the shutter blades open.

We have illustrated our invention in the present instance embodied in an automatic type shutter of the familiar pivoted blade symmetrical opening or diaphragm type, the blades being indicated at 1, their pivots at 2. This blade mechanism is not illustrated in Fig. 2, the parts being removed, as it may be of known construction and an understanding of its details is not essential to a full description of the present invention. It will suffice to say, therefore, that the blades are confined between the back or bottom of an annular shutter casing 3 and a partition plate 4 on which latter the shutter operating mechanism and the retarding mechanism hereinafter described are mounted. The central exposure opening 5 of the annular case, of course, extends through the partition member 4 and the blades are operated by a forked member 6 extending into cutaway portions 7 of the partition 4. This forked member is engaged by the downwardly turned end 8 of an actuator 9 pivoted on a stud 10 and returned to the normal position of Fig. 1 by a spring 11 encircling the stud to hold the blades closed. When the fork 6 which has a segmental movement is swung in a counter-clockwise direction to the position of Fig. 3 in the manner hereinafter described, the blades are opened.

The shutter is driven by a master lever 12 pivoted at 13 under the motive power of a spring 14 coiled about the pivot and acting against the case and against an ear or lug 15 on the lever. The lever is set and the spring placed under tension when rocked in a clockwise direction on its pivot by an operating lever 16 pivoted at 17 and having a finger portion 18 on the exterior of the casing. When this operating lever is pressed in a counter-clockwise direction, a finger 19 thereon engages the master lever 12 and sets it, though immediately releasing it by slipping off the end thereof in the usual manner of an automatic shutter. The operating lever 16 is thereafter returned to its normal position by a spring 20 and in doing so, the finger 19 rides beneath a beveled portion 21 of the master lever and displaces it laterally to regain its original coöperative relationship, the master lever being sufficiently resilient for this purpose.

The normal or deënergized position of the master lever, as shown in Fig. 1, is determined by the engagement of an abutment 22 thereon with a wall of the case and when it is set by the operating lever, a downwardly turned ear 23 on the arm 24 thereof rides up an incline 25 on the blade actuator 9 and engages with a shoulder 26 on the latter with which it snaps into contact, these lateral movements being permitted by the resiliency of the master lever. When the latter is immediately released, as before explained, the spring driven master member carries the blade actuator 9 with it and opens the blades, as shown in Fig. 3. The shoulder 26 is curved so that after the blades have reached their open position, the ear 23 slips off of it, permitting the actuator 9 to return and close the blades by means of its own spring 11.

While the master member is holding the blades open in this manner, it is simultaneously acting upon the retarding device which is preferably constructed as follows:

Pivoted on a stud 27 is a swinging or rocking segment 28 normally held in the position of Fig. 1 by a spring 29 coiled about the pivot and acting against a fixed pin 30 on the plate 4 and a pin 31 on the segment itself. The teeth 32 of this segment mesh with pin teeth 33 on an escapement wheel 34 turning on a stud 35. An anchor 36 coöperates with the escapement wheel in the usual manner being mounted on a stud 37 and fixed to this anchor is a vibratory arm or segment lever 38 having teeth 39 at its outer end meshing with pin teeth 40 on a balance wheel 41 turning on a stud 42. The opposite end of the arm 38 is counterweighted, as shown at 43 and it will be seen from the foregoing that the rotary movement of the escapement wheel 34 and the consequent oscillation of the anchor 36 will set up a vibratory movement of the arm 38 which in turn rapidly reverses the movement of the balance wheel 41 in opposite directions, the inertia of the balance wheel, arm, anchor and escapement wheel being cumulatively loaded upon the swinging movements of the segment 28 and transmitted, one through the other.

The segment 28 is swung in a clockwise direction from the position of the figures to so transmit motion to the retarding device while the ear 23 of the master member is dwelling on the shoulder 26 of the blade actuator to hold the blades open. For this purpose, there is pivoted upon the stud 27 of the segment 28 to turn therewith but also independently thereof a lever 43 having a lug 44 adapted to engage the segment and lock the two for joint movement in the operative or clockwise direction of the latter only. When the master member is moved by the operating member to ride the cam 25 on the blade actuator 9 and engage the ear 23 of the master member with the actuator, another ear 45 on the master member is thereby first lifted over and then engaged with an arm 46 of the lever 43 so that as the master member is released by the operating member immediately at the conclusion of its setting movement, it rocks the lever 43 as well as the blade actuator 9 and communicates its movement to the retarding device by swinging the segment 28. When the ear 23 of the master member slips off of the blade actuator 9, allowing the blades to close, it also slips off of the end of the arm 46 of the segment operating lever 43, allowing the latter to return to its former initial position under the influence of a spring 47. The segment 28 itself will also return but more slowly and the lever 43 returns independently in order that the master lever may quickly pick it up again, if necessary, always at the same place.

To regulate the resistance of the retarding device or the extent of the load that it imposes upon the master member, the throw of the segment 28 is varied, that is, the segment is adjusted to be picked up at an early or late point by the lever 43. For this purpose, the usual rotary cam or other preferred adjusting device on the casing cover (not shown) is employed to act upon the pin 48 on an arm 49 of the segment lever that takes the contact of spring 29 to advance the segment against the tension of this spring in a clockwise direction. By this means, it may be advanced so far that it is not reached at all by the lever 43 during the actuation of the latter by the master member.

We claim as our invention:

1. In a photographic shutter, the combination with blade mechanism, a master member for actuating the same and means for operating the master member, of a retarding device embodying an escapement wheel, a swinging segment geared to said wheel, means for regulating the initial position of the segment and a device pivoted axially of the segment but movable independently thereof and adapted to be driven by the master member and to drive the segment.

2. In a photographic shutter, the combination with blade mechanism, a master member for actuating the same and means for operating the master member, of a retarding device embodying an escapement wheel, a swinging segment geared to said wheel, means for regulating the initial position of the segment, a device pivoted axially of the segment but movable independently thereof and adapted to be driven by the master member and to drive the segment, a spring for moving the pivoted device always to the same initial position and means for throwing the master member into engagement therewith at the latter position.

3. In a photographic shutter, the combination with blade mechanism, a master member for actuating the same and means for operating the master member, of a retarding device embodying an escapement wheel, a swinging segment geared to said wheel, an anchor coöperating with the wheel, a balance wheel and means for driving the latter from the anchor.

4. In a photographic shutter, the combination with blade mechanism, a master member for actuating the same and means for operating the master member, of a retarding device embodying an escapement wheel, a swinging segment geared to said wheel, an anchor coöperating with the wheel, a balance wheel and a vibratory member.

5. In a photographic shutter, the combination with blade mechanism, a master member for actuating the same and means for operating the master member, of a retarding device embodying an escapement wheel, a swinging segment geared to said wheel, an anchor coöperating with the wheel, a balance wheel and a vibratory member secured to the anchor and geared to the balance wheel at one end, the opposite end of said member being counter-weighted.

ANDREW WOLLENSAK.
  FRIEDRICH A. GUSTAV PIRWITZ.